United States Patent Office 2,971,097
Patented Feb. 7, 1961

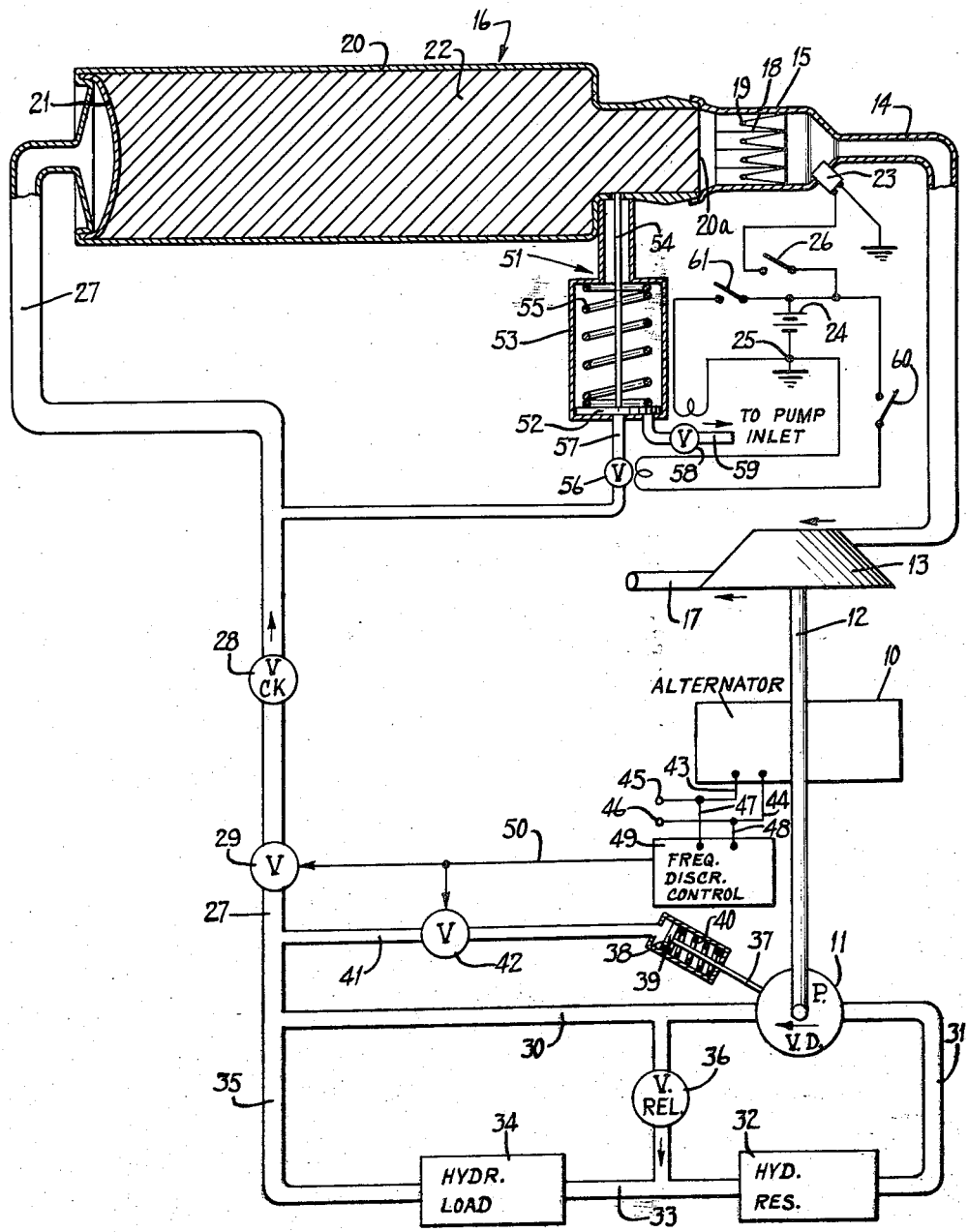

2,971,097
CONTROL FOR A SEMI-SOLID MONOFUEL DRIVEN TURBOALTERNATOR AND PUMP SYSTEM

Marshall J. Corbett, Cleveland, Ohio, assignor to Thompson Ramo Wooldridge Inc., Cleveland, Ohio, a corporation of Ohio Filed Jan. 2, 1959, Ser. No. 784,511
9 Claims. (Cl. 290—2)

This invention relates to a power generating system. More particularly, this invention relates to a hydraulically controlled system or unit adapted to utilize a gelatin mono-propellant fuel for generating auxiliary electrical power to actuate the electrical controls and related equipment of a missile, rocket, or similar vehicle driven by a main power plant or engine.

In missiles, rockets, and similar power driven vehicles, it is necessary to provide an auxiliary power source for operating the electrical control systems and equipment of the vehicle. It is a feature of the present invention to provide such apparatus wherein the frequency of the electrical power generated is controlled or held to a fixed predetermined value by providing a parasitic hydraulic load on the alternator shaft which in turn is driven by a gas turbine supplied from a gelatinous mono-propellant fuel combustor. The hydraulic fluid pressure generated is controlled to control the rate of extrusion of the gelatinous fuel and thereby control the speed of operation of the turbine and the alternator and the parasitic loading absorbs excess power generated by the turbine during a sudden reduction in demand for alternator output thereby reducing undesired transients. It is a further feature of this invention to provide in such a system a guillotine or blade type of cut off for the gelatinous fuel, the entire system being so arranged that it can be stopped and restarted without fuel reloading.

It is therefore an object of this invention to provide an auxiliary power unit which is adapted to be driven by the gases of combustion of a gelatinous mono-propellant fuel to achieve the foregoing ends.

It is a further object of this invention to provide an auxiliary electrical power unit which can be stopped and restarted without fuel reloading.

It is a further object of this invention to provide such an auxiliary electrical power unit requiring a minimum weight of fuel for a given output.

It is a further object of this invention to provide such an auxiliary electrical power unit in which a parasitic hydraulic load is utilized as a part of the control and actuating system.

Other objects, features, and advantages of the present invention will be more fully apparent to those skilled in the art from the following detailed description taken in connection with the accompanying drawing in which like reference characters refer to like parts throughout and wherein;

The single figure of the drawing is a diagrammatic view, partly sectional, illustrating the auxiliary power generating unit of the present invention.

Turning now to the drawing, there is shown an alternator or rotating electrical power generator 10 and a variable delivery hydraulic pump 11 both mounted and connected to be driven by a common output shaft 12 of a gas turbine 13. Gases to drive turbine 13 are supplied through a conduit 14 leading from the combustion chamber 15 of a gelatinous mono-propellant fueled rocket engine 16. The gases after driving the turbine 13 may be discharged to ambient atmosphere through a conduit 17. The combustion chamber 15 contains a plurality of burner tubes 18 each of which is preferably supplied with a fuel splitting device 19 such as a transverse wire or conical plug to split the extruded fuel so as to afford a conical burning surface. Fuel is extruded from a fuel tank 20 to the burner tubes 18 in combustion chamber 15 by a hydraulically actuated plunger or piston 21.

The auxiliary power unit shown in the drawing is adapted to burn a gelatinous mono-propellant fuel 22 contained in the fuel tank 20. In general, the type of mono-propellant fuel suitable for the system of the present invention is an extrudable plastic viscous slurry or a gelatinous material. Numerous suitable mono-propellant mixtures can be made into this form. Such mixtures preferably comprise a stable dispersion of a finely-divided, insoluble solid oxidizer in a continuous matrix of an oxidizable liquid fuel. The liquid fuel can be any oxidizable liquid, preferably an organic liquid containing carbon and hydrogen. Such liquid fuels include hydrocarbons such as triethyl benzene, dodecane and the like; compounds containing oxygen linked to a carbon atom such as esters including methyl maleate, diethyl phthalate, butyl oxalate, and the like; alcohols such as benzyl alcohol, triethylene glycol and the like; ethers such as methyl o-naphthyl ether and the like, and many others.

The solid oxidizer can be any suitable, active oxidizing agent which yields an oxidizing element such as oxygen, chlorine or fluorine readily for combustion of the fuel and which is insoluble in the liquid fuel vehicle. Such oxidizers include inorganic oxidizing salts such as ammonia, sodium and potassium perchlorate or nitrate and the metal peroxides such as barium peroxide.

Finely divided solid metal powders such as aluminum or magnesium may be incorporated in the mono-propellant composition as an additional fuel component along with the liquid fuel. Such metal powders possess the advantages both of increasing the fuel density and improving the specific impulse of the mono-propellant because of their high heats of combustion.

Gelling agents for imparting the desired cohesiveness and flow characteristics to the plastic mixture include natural and synthetic polymers such as polyvinyl chloride, polyvinyl acetate, cellulose esters such as cellulose acetate, cellulose ethers such as ethyl cellulose, metal salts of higher fatty acids such as the sodium or magnesium stearates and palmitates.

The amount of oxidizer is preferably at a stoichiometric level with respect to the liquid fuel, although minimum concentrations of solid oxidizer as low as 40% by weight are operative. In general, the oxidizer will constitute about 65% by weight of the mixture. A preferred operative mono-propellant includes a gel composed of up to 50% by weight of a liquid fuel, from 40 to 65% by weight of an oxidizer and from 3% to 10% by weight of a gelling agent. Aspecific operative fuel can be composed of about 50% by weight of solid oxidizers such as potassium perchlorate, about 45% by weight of liquid fuel such as triethyl benzine, and about 5% by weight of a gelling agent such as ethyl cellulose. It is to be understood, however, that this invention is not limited to use with any particular gelatin mono-propellant mixture but rather is directed to an apparatus particularly adapted to use any fuel of this class.

The fuel extruded from fuel tank 20 to the combustion chamber 15 is ignited by any conventional igniter 23 which may conveniently be of the hot wire type heated by electrical energy supplied from a battery or other power source 24 having one terminal 25 grounded and having its other terminal connected through a switch 26 to the igniter 23 so that upon closing of switch 26, an electrical circuit is completed which ignites the fuel in combustion chamber 15. Of course, it will be understood that igniters other than the hot wire type could be used.

Plunger or piston 21 is slidably mounted in the tank 20 in sealed relationship with the sides thereof and is driven toward the combustion chamber 15 to extrude fuel thereto by hydraulic pressure applied to the plunger through a conduit 27 having a check valve 28 and a pressure regulating valve 29 interposed in series relationship therein and connecting through a branch conduit 30 with the outlet or high pressure side of the variable delivery hydraulic pump 11. The inlet to hydraulic pump 11 is connected by a conduit 31 to a hydraulic fluid reservoir 32, the other side of which is connected by a conduit 33 to any useful or dummy hydraulic load 34 and thence by a conduit 35 back to the junction of conduits 27 and 30. A pressure relief valve 36 is connected between the outlet of pump 11 and the inlet of hydraulic reservoir 32 for a purpose to be described below.

The pump 11 as noted above is of the variable delivery type and is preferably of the wobble plate variable delivery type. The pump may, for example, be of the type shown and described in detail in U.S. Patent No. 2,373,723, issued on April 17, 1945, to G. A. Wahlmark, or it may be of the well-known Vickers type or of any other suitable type in which a mechanical adjustment varies the pump delivery. In the system shown in the drawing, provision for such adjustment is made by a plunger rod 37 which is attached to a piston 38 slidably mounted in a cylinder 39. The piston 36 is biased by a spring 40 enclosed in the cylinder 39 which urges the piston downwardly in the cylinder against hydraulic pressure admitted to the cylinder through a conduit 41 to act on the opposite side of the piston. Of course, when the force exerted by the spring is equal to the force exerted through hydraulic line 41 the piston and rod are stationary whereas if the hydraulic pressure is varied, motion of the adjusting rod results in a direction dependent upon whether the hydraulic force exceeds or is less than the spring force. The hydraulic pressure in line 41 is controlled through an electrically operated pressure regulating valve 42 interposed in line 41 between cylinder 40 and the point at which line 41 joins line 27 upstream from the outlet of the pump 11. The valve 42 may be of any suitable variable orifice electrically operated type in which the pressure dropped through the valve is varied in response to the magnitude of an electrical signal which varies the size of the valve orifice left exposed by the valve. The valve 29 in line 27 is generally of the same type as the valve 42 but is preferably designed to have a more sluggish or slower response to its electrical control signal than does the valve 42.

Output from alternator 10 is derived over wires 43 and 44 and may be applied for external use from terminals 45 and 46. A portion of this output is applied over wires 47 and 48 to a frequency discriminator control circuit 49 which compares the frequency of the alternator output with a source of fixed frequency signal and provides a direct current output signal over wire 50, the magnitude of which is proportional to the magnitude of any deviation of alternator frequency from the fixed predetermined frequency and the polarity of which is determined by the sign of the alternator deviation above or below the fixed frequency. The signal on line 50 is applied to valves 42 and 29 in such a manner as to cause the system to correct the deviation or reduce it to zero in accordance with the principles of a servo mechanism.

A suitable frequency discriminator control circuit is, for example, shown in the copending application of Fred H. Guth and John Donald Blake entitled "Power Generator Control System," Serial No. 639,765, filed February 12, 1957, and assigned to the same assignee as the present application. It will, however, be understood that any conventional frequency discriminator circuit can be used so that if the alternator frequency falls below the desired frequency, the valve 29 is adjusted to decrease the pressure drop across it so as to increase the pressure in line 27 as applied to piston 21 to thereby increase the rate of fuel extrusion so as to increase the turbine and alternator speed and hence, increase the frequency of the alternator output. Of course, should the alternator frequency exceed the desired frequency, the reverse of the foregoing occurs. In either event, simultaneously with the adjustment of valve 29, valve 42 is also adjusted so as to move the rod 37 to adjust the delivery of pump 11 to the newly specified operating conditions. This adjustment of the delivery rate of pump 11 assures that the system will operate with maximum efficiency and stability and will reduce to a minimum the amount of pressure regulation required to be imposed by the valve 29.

The pressure relief valve 36 and hydraulic load 34 are provided in order to dissipate all of the input energy from the turbine which is not used to maintain the output required by the alternator unit, particularly during transient conditions. The dissipating elements are, of course, the variable delivery pump 11 and the pressure regulating relief valve 36. The hydraulic system pressure rise through the pump determines the total hydraulic energy produced. The flow through the variable delivery pump is, as noted above, controlled in response to the signal indicative of the speed of the alternator so as to deliver just enough flow at regulated pressure to keep this speed constant under steady state conditions. Flow excess over this requirement passes through the relief valve dissipating its energy into heating of the hydraulic oil. Such flow excess occurs, for example, when there is a sudden reduction in the load on the alternator. In other words, the system described herein is intended to compensate for the fact that a sudden reduction in power required by the alternator from the turbine, can not be quickly and efficiently met merely by retarding the gel fired feed rate because it takes too much time for the gel wedges (or cones) to burn back to a new equilibrium condition. Of course, in applications wherein a relatively steady load is contemplated, a simpler system could be used. The parasitic hydraulic load is herein provided to compensate for transients. When electrical power demand is reduced the pump pumps more oil through the relief valve so that the speed of the alternator does not get out of hand. The parasitic load thus affords a trim or crude control to the basic control achieved by control of the gel fuel feed rate so that the total fuel load will more or less match the load schedule predicted for the system to achieve a more precise alternator speed control. The present system is capable of controlling alternator speed to ±1% under rapidly varying loads.

In the foregoing discussion, the normal continuous operation of the system so as to maintain a fixed frequency of alternator output has been described. In certain applications, however, it may be desirable to stop the operation of the system and to be able to restart the same without reloading the fuel tank. Such provision for stopping the system is afforded in the present invention by a guillotine blade type gelatinous fuel cut-off indicated generally by the reference character 51. The fuel cut-off device 51 comprises a piston 52 slidably mounted in a cylinder 53 to which is attached a blade 54 shown in the drawing in the open position and which blade has a cross-sectional shape such that when moved upwardly into the fuel tank it will entirely block the outlet 20a from the fuel tank to the combustion chamber 15. The piston 52 and integrally attached blade 54 are biased to the position shown in the drawing wherein the fuel tank outlet is opened by a spring 55 mounted in cylinder 53 so as to urge piston 52 to the bottom of the cylinder.

A two-position or on-off solenoid valve 56 is provided in a conduit 57 leading from conduit 27 to the bottom of cylinder 55. A similar two-position solenoid valve 58 is provided in a conduit 59 which leads from the bottom of cylinder 55 to the inlet of pump 11. The solenoid valves 56 and 58 are both preferably of the normally closed type which may be opened by actuating an associated solenoid through an appropriate electrical circuit. The circuit for the valve 56 may, for example, be completed by closing switch 60 thereby completing a circuit from the two sides of battery 24 through the valve winding. Similarly, the valve 58 may be opened by closing a switch 61 thereby completing a similar circuit from the two sides of battery 24 through its associated winding. Of course, if necessary, suitable current limiting resistors may be provided in each of these circuits. It will further be understood that each of the switches 60 and 61 may either be of the manually operated type or may be automatically operated in response to receipt of a radio signal if the system is to be used in a remotely controlled manner.

In either event, when it is desired to stop the system, the switch 60 is closed thereby opening valve 56 and admitting hydraulic fluid under pressure to the bottom of the cylinder 53. This forces the piston 52 upwardly in the cylinder against the action of spring 55 and interposes the blade 54 across the outlet 20a from the fuel tank 20 thereby terminating the extrusion of fuel to the combustion chamber. Since the mono-propellant fuels discussed above, which are used in the system, require a minimum pressure in the combustion chamber to sustain their continued burning, this cessation of extrusion will soon stop the burning of the fuels. That is to say, the pressure in the combustion chamber is determined by the total surface area of burning fuel as well as by the extrusion rate. When extrusion is entirely stopped, the conical surfaces provided by the fuel splitters burn away thereby decreasing the total burning area and hence decreasing combustion chamber pressure to a value less than that necessary to support combustion. The burning of the fuel is therefore terminated leaving a flat circular area of fuel at the entrance end of each of the burner tubes. When combustion of the fuel stops, the turbine 13, will, of course, also stop as will the alternator 10 and pump 11. The blade 54 is, however, held in its closed position since the check valve 28 in line 27 maintains hydraulic pressure in the cylinder 53 even after the pump 11 has stopped. Similarly, of course, pressure is also maintained throughout the portion of line 27 beyond the check valve 28 and against the piston 21.

When it is desired to restart the system, the valve 56 is first closed by opening switch 60 and valve 58 is then opened by closing switch 61. When valve 58 is opened, the hydraulic pressure on the piston 52 is released and the blade 54 is drawn downwardly into the cylinder 53 by action of spring 55. As soon as the blade 54 is removed from the fuel tank outlet, the residual hydraulic pressure acting on piston 21 and maintained by check valve 28 as described above, will again begin the process of extruding fuel into the combustion chamber. Of course, switch 26 is closed simultaneously with the closing of switch 61 so that the fuel so extruded is immediately ignited in order to again start the operation of turbine 13, alternator 10, and hydraulic pump 11. As the operation begins, hydraulic pressure is again built up by the pump and will therefore continue to urge the piston 21 to extrude fuel at the rate required to maintain the predetermined frequency of the output of alternator 10.

It will, of course, be understood that check valve 28 is set, as by spring biasing, so that it will maintain only a minimum residual pressure in line 27 but will not interfere with the normal operating control or adjustment of this pressure by valves 29 and variable delivery pump 11. That is to say, check valve 28 is such that it will maintain a minimum residual pressure in line 27 but will permit the reduction of this pressure by flow of hydraulic fluid backwardly through the valve when pressures in excess of this minimum are attained.

It will, of course, be apparent that many possible arrangements for the check valve 28 will afford the normal regulating action to valve 29 and the variable displacement pump 11 and yet assure that a minimum residual pressure is maintained against piston 21 after the system is stopped.

While a particular exemplary preferred embodiment of the invention has been described in detail above, it will be understood that modifications and variations therein may be effected without departing from the true spirit and scope of the novel concepts of the present invention as defined by the following claims.

I claim as my invention:

1. A power generating system comprising, an electrical power generating device of the rotating type, a variable delivery hydraulic pump, a gas driven turbine having an output shaft connected to drive said power generating device and said pump, a combustion chamber having an outlet connected to supply gases of combustion to drive said turbine, a fuel tank containing a gelatinous mono-propellant fuel and having an outlet connected to said combustion chamber, means in said combustion chamber to ignite said fuel, means actuated by the output of said hydraulic pump to extrude said fuel from said tank to said combustion chamber at a rate determined by the pressure of the output of said pump, means connected to provide an output signal which is a measure of the speed of rotation of said electrical power generating device, and means controlled by said output signal and connected to vary the output pressure of said pump responsively to the magnitude of said signal to vary the rate at which said fuel is extruded to said combustion chamber so as to maintain said speed of said electrical generating device at a predetermined value.

2. A power generating system comprising, an electrical power generating device of the rotating type, a hydraulic pump, a gas driven turbine having an output shaft connected to drive said power generating device and said pump, a combustion chamber having an outlet connected to supply gases of combustion to drive said turbine, a fuel tank containing a gelatinous mono-propellant fuel and having an outlet connected to said combustion chamber, means in said combustion chamber to ignite said fuel, plunger means actuated by the output of said hydraulic pump to extrude said fuel from said tank to said combustion chamber, and hydraulically actuated means to close the output of said fuel tank to prevent extrusion of said fuel to stop said system.

3. A power generating system comprising, an electrical power generating device of the rotating type, a hydraulic pump, a gas driven turbine having an output shaft connected to drive said power generating device and said pump, a combustion chamber having an outlet connected to supply gases of combustion to drive said turbine, a fuel tank containing a gelatinous mono-propellant fuel and having an outlet connected to said combustion chamber, means in said combustion chamber to ignite said fuel, plunger means actuated by the output of said hydraulic pump to extrude said fuel from said tank to said combustion chamber, and blade means to close the outlet of said fuel tank to prevent extrusion of said fuel to stop said system, said blade means being biased to a position in which said fuel tank outlet is open, valve controlled means to apply hydraulic fluid from the output of said pump to close said blade means, and check valve means positioned to maintain a minimum residual hydraulic pressure against said plunger means in said fuel tank when said system is stopped to permit restarting said system without reloading said fuel tank.

4. A power generating system comprising, an electrical power generating device of the rotating type, a hydraulic pump, a gas driven turbine having an output shaft connected to drive said power generating device and said pump, a combustion chamber having an outlet connected to supply gases of combustion to drive said turbine, a fuel tank containing a gelatinous mono-propellant fuel and having an outlet connected to said combustion chamber, means in said combustion chamber to ignite said fuel, means actuated by the output of said hydraulic pump to extrude said fuel from said tank to said combustion chamber, hydraulically actuated means to close the outlet of said fuel tank to prevent extrusion of said fuel to stop said system, and means to maintain a minimum residual hydraulic pressure on said extruding means when said system is stopped to permit restarting said system without reloading said fuel tank.

5. A power generating system comprising, an electrical power generating device of the rotating type, a variable delivery hydraulic pump, a gas driven turbine having an output shaft connected to drive said power generating device and said pump, a combustion chamber having an outlet connected to supply gases of combustion to drive said turbine, a fuel tank containing a gelatinous mono-propellant fuel and having an outlet connected to said combustion chamber, means in said combustion chamber to ignite said fuel, means actuated by the output of said hydraulic pump to extrude said fuel from said tank to said combustion chamber at a rate determined by the pressure of the output of said pump, means connected to provide an output signal which is a measure of the speed of rotation of said electrical power generating device, means connected to be controlled by said output signal to vary the output pressure of said pump responsively to the magnitude of said signal to vary the rate at which said fuel is extruded to said combustion chamber so as to maintain said speed of said electrical generating device at a predetermined value, hydraulically actuated means to close the outlet of said fuel tank to prevent extrusion of said fuel to stop said system, and means to maintain a minimum residual pressure against said fuel extrusion means when said system is stopped to permit restarting of said system without reloading said fuel tank.

6. A power generating system comprising, an electrical power generating device of the rotating type, a variable delivery hydraulic pump, a gas driven turbine having an output shaft connected to drive said generating device and said pump, a combustion chamber having an outlet connected to supply gases of combustion to drive said turbine, a fuel tank containing a gelatinous mono-propellant fuel and having an outlet connected to said combustion chamber, means in said combustion chamber to ignite said fuel, plunger means in said fuel tank actuated by the output of said hydraulic pump to extrude said fuel from said tank to said combustion chamber, means connected to vary the delivery of said pump in response to variations in the speed of rotation of said power generating device so as to maintain said speed at a predetermined constant value, hydraulically actuated means to close the outlet of said fuel tank to prevent extrusion of said fuel to stop said system, and means to maintain a minimum residual hydraulic pressure against said plunger means in said fuel tank when said system is stopped to permit restarting said system without reloading said fuel tank.

7. In a power generating system, the improvements comprising, a hydraulic pump, a gas driven turbine having an output shaft connected to drive said pump, a combustion chamber having an outlet connected to supply gases of combustion to drive said turbine, a fuel tank containing a gelatinous mono-propellant fuel and having an outlet connected to said combustion chamber, means in said combustion chamber to ignite said fuel, plunger means in said fuel tank actuated by the output of said hydraulic pump to extrude said fuel from said tank to said combustion chamber, means to close the outlet of said fuel tank to prevent extrusion of said fuel to stop said system, and means to maintain a minimum residual hydraulic pressure against said plunger when said system is stopped to permit restarting said system without reloading said fuel tank.

8. A power generating system comprising, an electrical power generating device of the rotating type, a variable delivery hydraulic pump, a gas driven turbine having an output shaft connected to drive said power generating device and said pump, a combustion chamber having an outlet connected to supply gases of combustion to drive said turbine, a fuel tank containing a gelatinous mono-propellant fuel and having an outlet connected to said combustion chamber, means in said combustion chamber to ignite said fuel, plunger means in said fuel tank connected to be actuated by the output of said hydraulic pump to extrude said fuel from said tank to said combustion chamber at a rate determined by the pressure of said output of said pump, frequency discriminator means connected to provide an output signal which is a measure of the deviation of the speed of rotation of said electrical power generating device from a predetermined speed, first means controlled by said output signal and connected to vary the output pressure of said pump responsively to the magnitude and polarity of said signal, second means controlled by said output signal to vary the hydraulic pressure applied to said plunger means to vary the rate at which said fuel is extruded to said combustion chamber so as to maintain said speed of said electrical generating device at said predetermined value, hydraulically actuated blade means to close the outlet of said fuel tank to prevent extrusion of said fuel to stop said system, and check valve means positioned to maintain a minimum residual hydraulic pressure against said plunger means when said system is stopped to permit restarting said system without reloading said fuel tank.

9. A power generating system comprising, an electrical power generating device of the rotating type, a hydraulic pump, a gas driven turbine having an output shaft connected to drive said power generating device and said pump, a combustion chamber having an outlet connected to supply gases of combustion to drive said turbine, a fuel tank containing a gelatinous mono-propellant fuel and having an outlet connected to said combustion chamber, means in said combustion chamber to ignite said fuel, plunger means in said fuel tank actuated by the output of said hydraulic pump to extrude said fuel from said tank to said combustion chamber, blade means positioned for sliding motion across the outlet of said pump, said blade means being spring biased to a position in which said outlet is open, and valve controlled means to apply hydraulic pressure from said pump to actuate said blade to a position in which said outlet of said fuel tank is closed to prevent extrusion of said fuel to stop said system.

References Cited in the file of this patent

UNITED STATES PATENTS

| 2,243,944 | Donaldson | June 3, 1941 |
| 2,523,008 | Goddard | Sept. 19, 1950 |
| 2,585,626 | Chilton | Feb. 12, 1952 |
| 2,695,365 | McLean | Nov. 23, 1954 |
| 2,703,960 | Prentiss | Mar. 15, 1955 |
| 2,723,528 | Stark et al. | Nov. 15, 1955 |
| 2,858,672 | Clark | Nov. 4, 1958 |
| 2,895,056 | Bristol | July 14, 1959 |

FOREIGN PATENTS

| 582,621 | Great Britain | Nov. 22, 1946 |
| 763,015 | Great Britain | Dec. 5, 1956 |